May 19, 1953   E. P. MILLER   2,638,778
VISCOSIMETER
Filed July 29, 1948
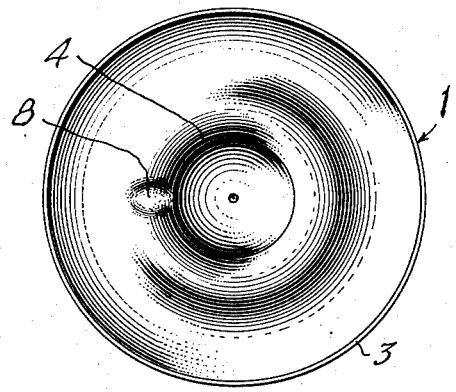
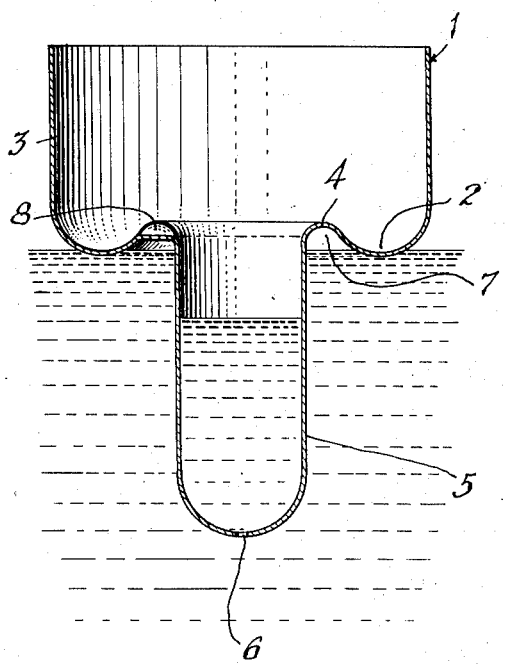
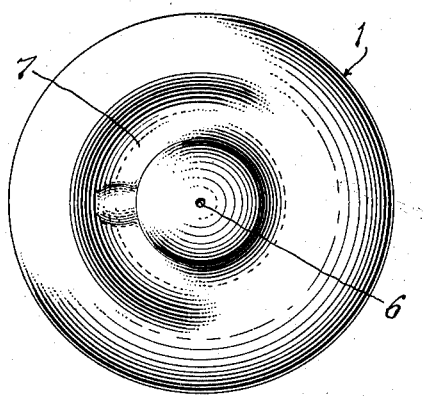
Inventor:
ELMER P. MILLER, Patented May 19, 1953

2,638,778

UNITED STATES PATENT OFFICE 2,638,778

VISCOSIMETER

Elmer P. Miller, Irvington, N. J.

Application July 29, 1948, Serial No. 41,240

3 Claims. (Cl. 73—54)

This invention relates to viscosimeters of the type designed to float in the liquid whose viscosity is to be determined, and one object of the invention is to provide such a viscosimeter which shall be simple and inexpensive in construction, easy to operate and by which the viscosity of a liquid can be quickly and accurately ascertained.

Another object of the invention is to provide a novel and improved viscosimeter in the form of a container which ordinarily will float in a liquid and has an opening to permit the inflow of liquid under a constant head.

Other objects are to provide a viscosimeter of this character which shall have rounded surfaces which will cause displacement of bubbles or foreign matter on the surface of the liquid as the viscosimeter is dropped into the liquid, which can be easily cleaned and which shall minimize the variables in viscosity readings frequently caused by the surface tension of some liquids on the metal surfaces of known types of viscosimeters; and to obtain other advantages and results that will be brought on by the following description in conjunction with the accompanying drawing in which Figure 1 is a top plan view of a viscosimeter embodying the invention.

Figure 2 is a bottom plan view thereof, and

Figure 3 is a central vertical sectional view through the viscosimeter showing it afloat in a body of liquid.

Specifically describing the illustrated embodiment of the invention, the viscosimeter is in the form of a container comprising a circular cup-like body portion 1 having at its bottom an annular groove 2 formed between the side walls 3 of the body and a coaxially upstanding convex annular rib 4 from the inner perimeter of which extends a measuring cup 5 of a diameter substantially less than that of the body 1 and having an opening 6 at its outer extremity. An annular groove 7 is provided in the bottom of the body 1 in coaxial surrounding relation to the measuring cup 5, and a transverse or radial groove 8 is formed in the annular rib or bead 4 on the interior of the body, said groove leading from the measuring cup 5 to the annular groove 2 at the bottom of the body and serving as a mark to indicate a certain level of the liquid in the measuring cup as the container sinks into the liquid.

The viscosimeter may be formed in any suitable way or of any suitable material, but preferably is formed of metal by a spinning or die-casting operation.

Ordinarily, the instrument will be tested in a standard liquid before it is put into actual use for determining the viscosity of other liquids. For example, the instrument will be dropped into the standard liquid and will immediately sink to a level depending upon its weight and displacement, after which liquid will flow through the orifice 6 into the cup. The operator will start a stop-watch at the instant that the liquid begins to flow and the liquid will continue to flow slowly into the measuring cup 5 as the instrument sinks. This action will continue until the liquid reaches and breaks through the groove 8, at which instant the stop-watch will be stopped and the time required for the liquid level to reach the gauge groove 8 will be recorded. It will be noted that air will be trapped in the annular groove 7 between the bottom of the body 1 and the surface of the liquid and the volume of air in this groove controls the stopping point of the sinking of the instrument. Preferably the weight of the cup, and the volume of the space provided in the groove 7, will be calculated to cause the sinking of the instrument to stop when the level of the liquid reaches the top of the annular rib or rim 4.

It will be understood by those skilled in the art that the viscosity of any other liquid as compared with that of the standard liquid will be proportionate to the rate of flow of the liquid into the cup 5 through the orifice 6. In other words, the viscosity of any other liquid as compared with that of the standard liquid is proportional to the time which is required for the liquid to rise in the cup 5 from the instant that the cup is dropped into the liquid until the liquid breaks through the gauge groove 8. It will also be understood by those skilled in the art that the weight of the instrument and the size of the orifice 6 must have a certain relation in order to obtain a standard reading.

From the foregoing, it will be observed that the weight of the instrument initiates and maintains a standard head or pressure on the bottom end of the measuring cup when the instrument is afloat on a liquid and the liquid contacting surfaces of the instrument are curved so that bubbles or other matter on the surface of the liquid will be moved aside by the motion of the instrument as it is dropped into the liquid. Moreover, the rounded smooth surfaces permit the instrument to be easily cleaned and the particular shape and relation of the body 1 to the cup 5 makes it possible to easily start the instrument in an inverted position to reduce the possibility of injury to the orifice 6. Unusually accurate readings can be obtained in a shorter time than it is possible with many other known viscosimeters and the instrument is simple and inexpensive both as to material and labor costs in manufacture.

I claim:

1. A viscosimeter comprising a container having a main cylindrical cup-like body, a coaxial measuring cup of smaller diameter than said body projecting from the bottom thereof and formed with a coaxial liquid inlet orifice, a coaxial annular rib at the zone juncture of said cup with the bottom of said body, and a transverse groove in said rib leading from said cup into said body to indicate a liquid level in said cup.

2. A viscosimeter as defined in claim 1 wherein there is a recess in the outside of the bottom of said body to form an air chamber between said body and the surface of a liquid when said container is afloat on said liquid.

3. A viscosimeter as defined in claim 1 wherein there is a coaxial annular groove in the outside of the bottom of said body and encircling said measuring cup to form an air chamber between the body and the surface of a liquid when the container is afloat on said liquid.

ELMER P. MILLER.

References Cited in the file of this patent

UNITED STATES PATENTS

| Number | Name | Date |
|---|---|---|
| 1,132,621 | Saybolt | Mar. 23, 1915 |
| 1,292,276 | Dysart | Jan. 21, 1919 |
| 2,132,015 | Collins | Oct. 4, 1938 |

FOREIGN PATENTS

| Number | Country | Date |
|---|---|---|
| 229,225 | Switzerland | Oct. 15, 1943 |